US008253721B2

(12) United States Patent
Lee

(10) Patent No.: US 8,253,721 B2

(45) Date of Patent: Aug. 28, 2012

(54) LIQUID CRYSTAL DISPLAY DEVICE INCLUDING SOURCE VOLTAGE GENERATOR AND METHOD OF DRIVING LIQUID CRYSTAL DISPLAY DEVICE

(75) Inventor: Sung-Min Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 828 days.

(21) Appl. No.: 11/827,208

(22) Filed: Jul. 11, 2007

(65) Prior Publication Data

US 2008/0122824 A1 May 29, 2008

(30) Foreign Application Priority Data

Nov. 28, 2006 (KR) ........................ 10-2006-0118581

(51) Int. Cl.
*G09G 5/00* (2006.01)
*G02F 1/1333* (2006.01)

(52) U.S. Cl. .......................................... 345/212; 349/40

(58) Field of Classification Search .................. 345/100, 345/94, 212; 349/40

See application file for complete search history.

(56) References Cited

U.S. PATENT DOCUMENTS

| | | | | |
|---|---|---|---|---|
| 5,596,342 | A * | 1/1997 | Ikezaki et al. | 345/87 |
| 5,619,222 | A * | 4/1997 | So | 345/92 |
| 5,945,970 | A * | 8/1999 | Moon et al. | 345/211 |
| 6,337,722 | B1 * | 1/2002 | Ha | 349/40 |
| 6,690,433 | B2 * | 2/2004 | Yoo et al. | 349/40 |
| 7,042,428 | B2 * | 5/2006 | Park | 345/92 |
| 7,592,989 | B2 * | 9/2009 | Shen | 345/87 |
| 2003/0071767 | A1 * | 4/2003 | Park | 345/42 |
| 2004/0085284 | A1 * | 5/2004 | Chen et al. | 345/100 |
| 2004/0246219 | A1 * | 12/2004 | Moon | 345/89 |
| 2005/0212789 | A1 * | 9/2005 | Kim | 345/204 |
| 2005/0243046 | A1 * | 11/2005 | Hong | 345/87 |
| 2005/0285984 | A1 * | 12/2005 | Tsai et al. | 349/40 |
| 2007/0040795 | A1 * | 2/2007 | Lee et al. | 345/100 |
| 2007/0103423 | A1 * | 5/2007 | Tsai et al. | 345/100 |
| 2007/0176866 | A1 * | 8/2007 | Hung et al. | 345/87 |

* cited by examiner

*Primary Examiner* — Adam J Snyder

(74) *Attorney, Agent, or Firm* — Brinks Hofer Gilson & Lione

(57) ABSTRACT

A display device, such as a liquid crystal display (LCD) includes a driving circuit coupled with a display panel. The driving circuit may have a buildup of static electricity that could degrade the image quality of the display panel. A reset unit may be a part of the driving circuit. The reset unit may power off and power on the display device to dissipate the static electricity without affecting the image quality of the display panel.

19 Claims, 4 Drawing Sheets

LIQUID CRYSTAL DISPLAY DEVICE INCLUDING SOURCE VOLTAGE GENERATOR AND METHOD OF DRIVING LIQUID CRYSTAL DISPLAY DEVICE

This application claims the benefit of Korean Patent Application No. 2006-0118581, filed on Nov. 28, 2006, which is hereby incorporated by reference in its entirety.

TECHNICAL FIELD

The present application relates to a liquid crystal display (LCD) device and a method of driving the liquid crystal display device. Specifically, a driving circuit of a liquid crystal display device that may include a reset unit, which in turn may reset the driving of the liquid crystal display device.

BACKGROUND

Display devices have become thinner and larger as industrial utilization has increased. Among the various types of flat panel display (FPD) devices, liquid crystal display (LCD) devices and plasma display panel (PDP) devices are widely used. LCD devices are widely used as monitors for notebook computers and desktop computers because of characteristics such as light weight, portability and low power consumption. Specifically, active matrix type LCD devices having thin film transistors (TFTs) as switching elements have been researched and developed due to the quality of the display of moving images.

FIG. 1 is a schematic block diagram of a liquid crystal display device according to the related art, and FIG. 2 is a schematic view showing a liquid crystal panel of the liquid crystal display device according to the related art. In FIGS. 1 and 2, the liquid crystal display device includes a liquid crystal panel 2 and a liquid crystal module (LCM) driving circuit 26. The LCM driving circuit 26 includes an interface 10, a timing controller 12, a source voltage generator 14, a reference voltage generator 16, a data driver 18 and a gate driver 20. The data driver 18 may also be referred to as a source driver, which may be distinguished from the source voltage generator 14. RGB data and timing sync signals, such as clock signals, horizontal sync signals, vertical sync signals and data enable signals may be input from a driving system (not shown) such as a personal computer to the interface 10. The interface 10 outputs the RGB data and the timing sync signals to the timing controller 12. For example, a low voltage differential signal (LVDS) interface and transistor-transistor logic (TTL) interface may be used for transmission of the RGB data and the timing sync signals. In addition, the interface 10 may be integrated on a single chip together with the timing controller 12.

A plurality of gate lines "GL1" to "GLn" and a plurality of data lines "DL1" to "DLm" are formed on the liquid crystal panel 2 and are driven respectively by the gate driver 20 and the data driver 18. The plurality of gate lines "GL1" to "GLn" and the plurality of data lines "DL1" to "DLm" cross each other to define a plurality of pixel regions "P." For each pixel region P, a thin film transistor "TFT" is connected to the corresponding gate line and the corresponding data line. In addition, a liquid crystal capacitor "LC" connected to the thin film transistor "TFT" is formed in each pixel region "P." The pixel formed at the liquid crystal capacitor "LC" is turned on/off by the thin film transistor "TFT," thereby modulating transmittance of incident light for the displaying of images.

The timing controller 12 generates data control signals for the data driver 18 including a plurality of data integrated circuits (ICs), and gate control signals for the gate driver 20 including a plurality of gate ICs. In addition, the timing controller 12 outputs data signals to the data driver 18. The reference voltage generator 16 generates reference voltages of a digital-to-analog converter (DAC) used in the data driver 18. The reference voltages are set up according to transmittance-voltage characteristics of the liquid crystal panel 2. The data driver 18 determines the reference voltages for the data signals according to the data control signals and outputs the determined reference voltages to the liquid crystal panel 2 to adjust a rotation angle of liquid crystal molecules.

The gate driver 20 controls ON/OFF operation of the thin film transistors (TFTs) in the liquid crystal panel 2 according to the gate control signals from the timing controller 12. Accordingly, the data signals from the data driver 18 are supplied to pixels in the pixel regions of the liquid crystal panel 2 through the TFTs. The source voltage generator 14 supplies source voltages to elements of the LCD device and a common voltage to the liquid crystal panel 2. Although not shown in FIGS. 1 and 2, a backlight unit including at least one lamp is disposed under the liquid crystal panel 2 to supply a light to the liquid crystal panel.

The LCD device includes a power management unit such as the source voltage generator 14 to supply units of the LCD device with source power for operation. FIG. 3 is a schematic block diagram showing a source voltage generator for a liquid crystal display device according to the related art. In FIG. 3, a source voltage generator 14 generates source voltages such as a driving voltage, a gate high voltage Vgh, a gate low voltage Vgl, a gamma reference voltage Vγ and a common voltage Vcom based on an external voltage Vcc from an external system. The driving voltages are supplied to the timing controller 12, the data driver 18, the gate driver 20 and the reference voltage generator 16 (of FIG. 1). Accordingly, the source voltage generator 14 includes a power control integrated circuit (P-IC) 14*a*, a driving voltage generator 14*b*, a gate high voltage generator 14*c*, a gate low voltage generator 14*d* and a shutdown controller 14*e*.

The P-IC 14*a* has an IC type including a plurality of circuital elements. The P-IC 14*a* generates supply voltages for the driving voltage generator 14*b*, the gate high voltage generator 14*c* and the gate low voltage generator 14*d* using the external voltage Vcc of about 0V to about 3.3V. The driving voltage generator 14*b* generates a driving voltage Vdd of about 15V using the external voltage Vcc. The driving voltage Vdd is supplied to the data driver 18. In addition, the driving voltage Vdd is distributed by a distribution resistor to be the common voltage. The common voltage Vcom is supplied to a common electrode of the liquid crystal panel 2 through a pad (not shown). A liquid crystal layer of the liquid crystal panel 2 is driven by the driving voltage Vdd and the common voltage Vcom.

The gate high voltage generator 14*c* generates a gate high voltage Vgh of about 25V to about 27V using the external voltage Vcc. The gate high voltage Vgh is supplied to the gate driver 20 (of FIG. 2) and is used for a gate signal that is applied to the plurality of gate lines GL1 to GLn (of FIG. 2) by the gate driver 20. The gate low voltage generator 14*d* generates a gate low voltage Vgl of about −5V using the external voltage Vcc. The gate low voltage Vgl is supplied to the gate driver 20 and is used for the gate signal.

The shutdown controller 14*e* receives a dynamic power management (DPM) signal from the timing controller 12 (of FIG. 1) and controls a shutdown of the P-IC 14*a*. Accordingly, the P-IC 14*a* has a shutdown signal input terminal (not shown). For example, when a shutdown signal of about 0V to about 0.7V is inputted to the P-IC 14*a*, the P-IC 14*a* may be shut down and the supply voltages for operating the driving voltage generator 14*b*, the gate high voltage generator 14*c* and the gate low voltage generator 14*d* may be not generated. As a result, operation of the source voltage generator 14 is substantially stopped and the LCD device is powered off based on receipt of the shutdown signal inputted to the P-IC 14*a*.

In the LCD device with the source voltage generator 14, static electricity induced at the liquid crystal panel 2 may be discharged to the source voltage generator 14 through the gate driver 20 (of FIG. 1). The static electricity may interfere with the generation of the gate high voltage Vgh and the gate low voltage Vgl in the source voltage generator 14. For example, the gate high voltage generator 14*c* may not generate the normal gate high voltage Vgh of about 25V to about 27V but may output an abnormal gate high voltage of about 7V. The abnormal gate high voltage that differs from the normal gate high voltage Vgh may result in deterioration of an image quality of the liquid crystal panel 2 (of FIG. 1). For example, the abnormal gate high voltage may result in an abnormality on the display, such as a horizontal stripe.

SUMMARY

In a first aspect, a driving circuit for a display device includes a timing controller and a data driver coupled with the timing controller. The timing controller is configured to provide power to data lines of a display panel of the display device. A gate driver is coupled with the timing controller and configured to provide power to gate lines of a display panel of the display device. A source voltage generator is coupled with the timing controller and the gate driver. The source voltage generator includes a power control integrated circuit (P-IC), a gate high voltage generator coupled with the P-IC, and a reset unit coupled with the P-IC and the gate high voltage generator. The reset unit is configured to initiate a shut off of an output voltage of the P-IC.

In a second aspect, a source voltage generator for powering a display includes a power control integrated circuit (P-IC) configured to receive an external voltage and output a source voltage. A shutdown controller is coupled with the P-IC and configured to provide a shutdown signal to the P-IC. A reset unit is coupled with the shutdown controller. The reset unit is configured to initiate the transmission of the shutdown signal to the P-IC from the shutdown controller upon a buildup of static electricity.

In a third aspect, a method is disclosed for resetting a display device including providing a reset unit in a source voltage generator. A buildup of static electricity is detected at the source voltage generator and a shutdown signal is generated in a reset unit in response to the detection of the buildup of static electricity. A source voltage output from the source voltage generator is shut off in response to the shutdown signal. The source voltage output is powered on following the shutting off of the source voltage output.

It is to be understood that both the foregoing general description and the following detailed description of the present invention are exemplary and explanatory and are intended to provide further explanation of the invention as claimed. Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views. The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts. Hereinafter, a driving circuit for a display device and a method of driving a display device preventing a deterioration of a display panel due to a static electricity will be described with reference to the accompanying drawings. The display device may include an LCD device and the display panel may be a liquid crystal (LC) panel and will be described as such throughout this disclosure.

Figure 1:
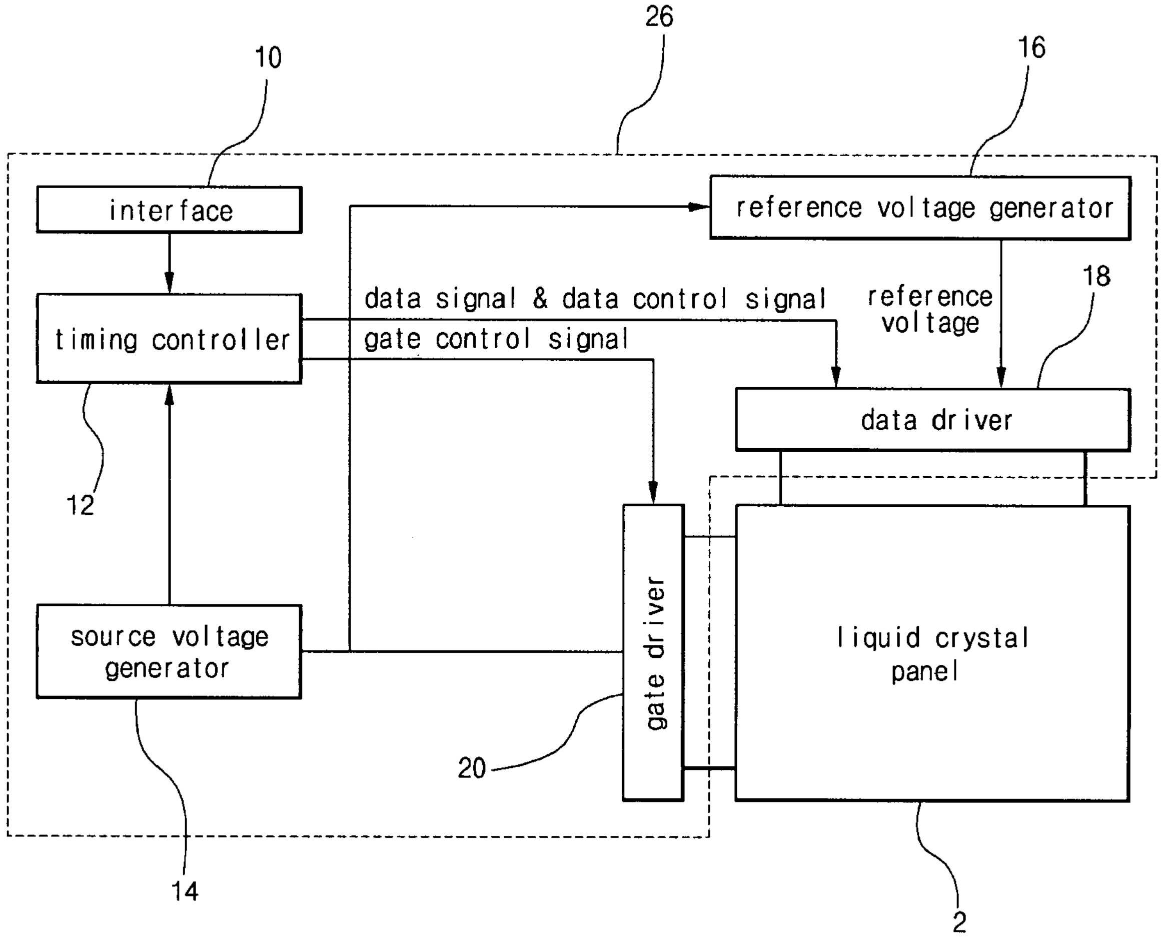
(related art) FIG. 1
FIG. 1 is a schematic block diagram of a liquid crystal display device according to the related art.
Figure 2:
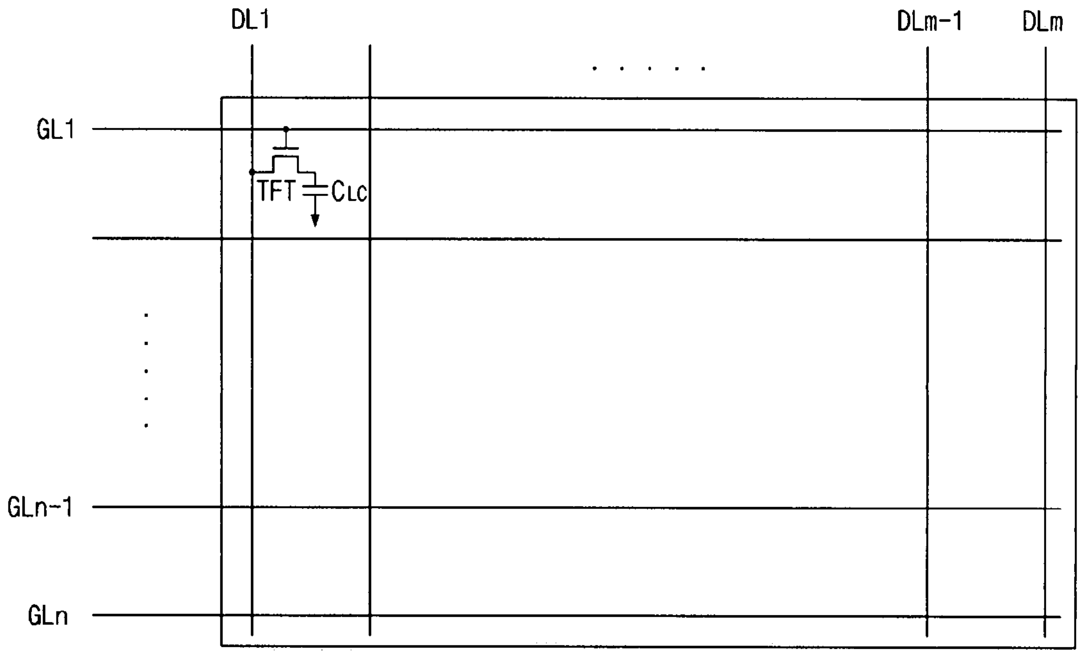
(related art) FIG. 2
FIG. 2 is a schematic view showing a liquid crystal panel of the liquid crystal display device according to the related art.
Figure 3:
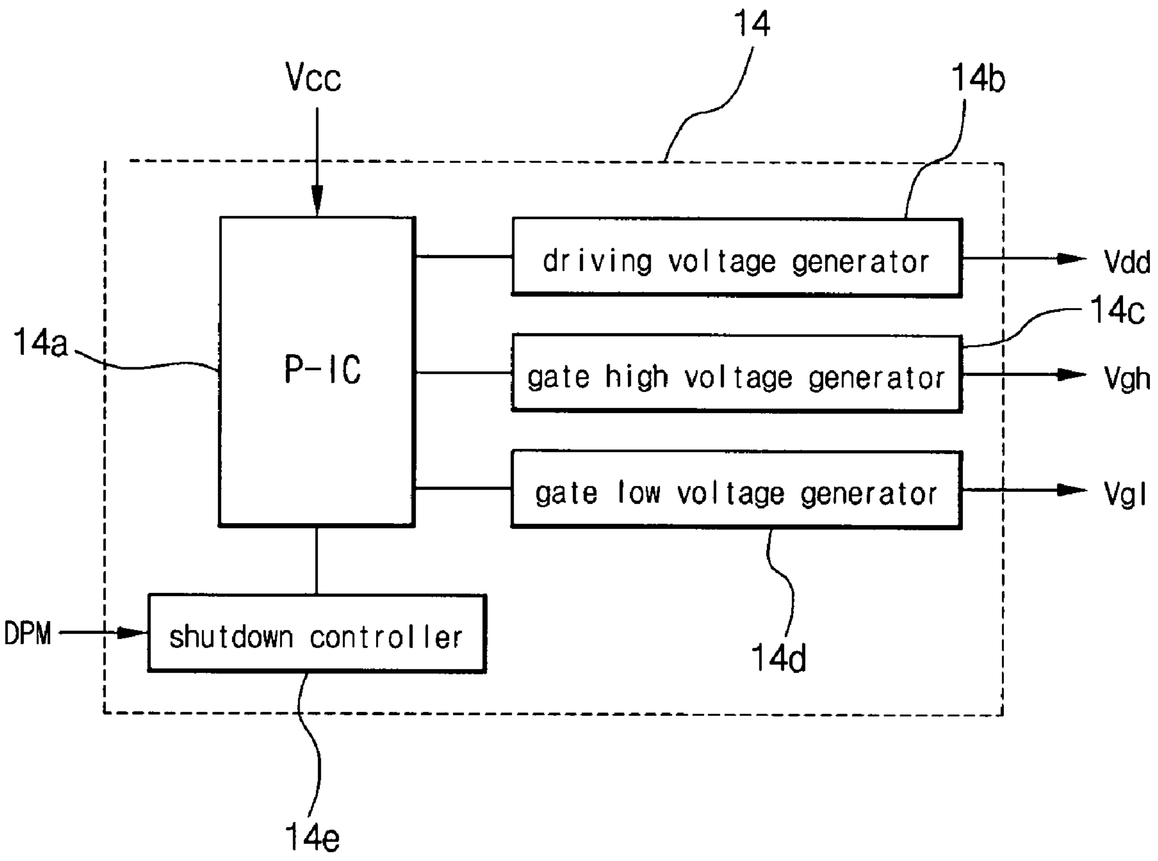
(related art) FIG. 3
FIG. 3 is a schematic block diagram showing a source voltage generator for a liquid crystal display device according to the related art.
Figure 4:
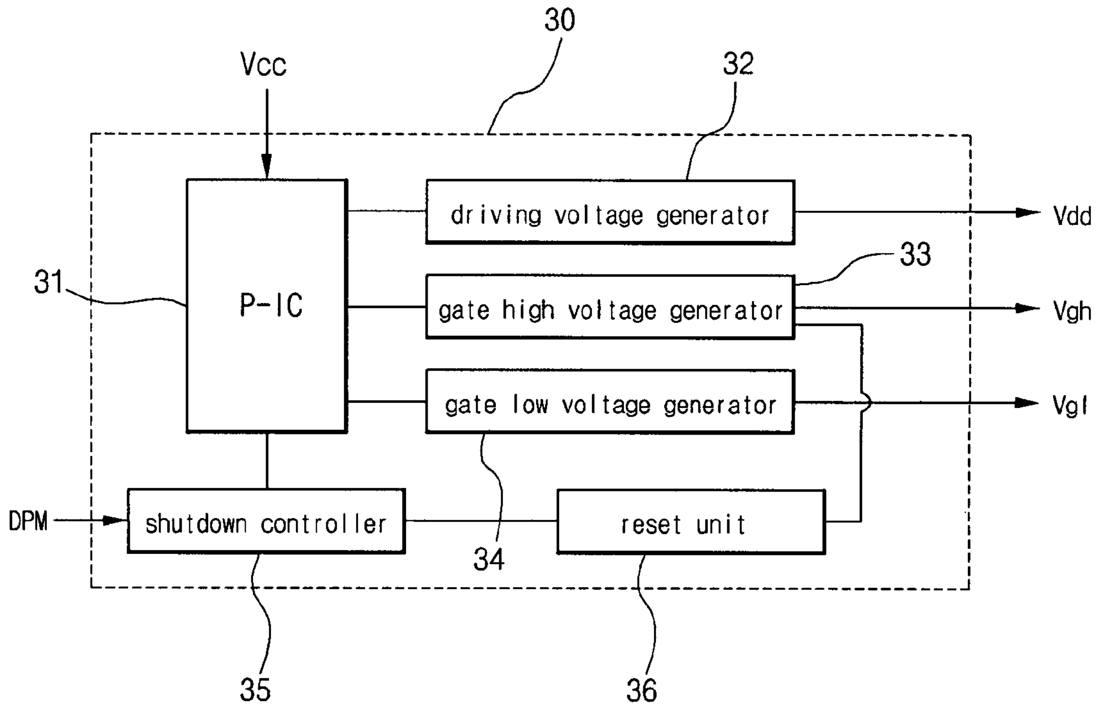
FIG. 4 is a schematic block diagram showing a source voltage generator of a liquid crystal display device according to one embodiment.

FIG. 4 is a schematic block diagram showing a source voltage generator 14 of a liquid crystal display device according to one embodiment. In FIG. 4, a source voltage generator 30 for a liquid crystal display (LCD) device includes a power control integrated circuit (P-IC) 31, a driving voltage generator 32, a gate high voltage generator 33, a gate low voltage generator 34, a shutdown controller 35 and a reset unit 36. The P-IC 31 has an IC type including a plurality of circuital elements and generates supply voltages for the driving voltage generator 32, the gate high voltage generator 33 and the gate low voltage generator 34. The supply voltages may be generated using an external voltage Vcc of about 0V to about 3.3V from an external system (not shown). The P-IC 31 generates the supply voltages while a dynamic power management (DPM) signal from an off-reference voltage of about 0V to about 0.7V is inputted. In addition, the P-IC 31 supplies a ground voltage and functions as a switch. In alternative embodiments, the approximate voltages discussed herein may vary. The approximate voltages are used for illustrative purposes throughout this disclosure and are merely representative of one embodiment, or one example.

The driving voltage generator 32 is coupled with the P-IC 31. Herein, the phrase "coupled with" is defined to mean directly connected to or indirectly connected through one or more intermediate components. The driving voltage generator 32 generates a driving voltage Vdd of about 15V using the external voltage Vcc that is supplied to a data driver of the LCD device. In addition, the driving voltage Vdd is distributed by a distribution resistor as a common voltage Vcom. The common voltage Vcom is supplied to a common electrode of the liquid crystal panel 2 through a pad (not shown). A liquid crystal layer of the liquid crystal panel 2 is driven by the driving voltage Vdd and the common voltage Vcom.

The gate high voltage generator 33 generates a gate high voltage Vgh of about 25V to about 27V using the external voltage Vcc. The gate high voltage Vgh is supplied to a gate driver of the LCD device and is used for a gate signal that is applied to the plurality of gate lines by the gate driver.

The gate low voltage generator 34 generates a gate low voltage Vgl of about −7V to about −5V using the external voltage Vcc. The gate low voltage Vgl is supplied to the gate driver of the LCD device and is used for the gate signal. The gate high voltage Vgh and the gate low voltage Vgl correspond to voltages to turn a thin film transistor (TFT) on and off, respectively.

The shutdown controller 35 coupled with the P-IC 31 receives a dynamic power management (DPM) signal from a timing controller and controls the P-IC 31 to be turned on/off. Accordingly, the P-IC 31 has a shutdown signal input terminal (not shown). For example, when a shutdown signal having a voltage within the off-reference voltage of about 0V to about 0.7V is inputted to the P-IC 31 from the shutdown controller 35, the P-IC 31 may be shut down. Upon receiving a shutdown signal, the supply voltages may be not supplied to the driving voltage generator 32, the gate high voltage generator 33 and the gate low voltage generator 34. Operation of the source voltage generator 30 is substantially stopped and the LCD device is powered off based on the shutdown signal.

The reset unit 36 is coupled with the gate high voltage generator 33 and the shutdown controller 35. When static electricity induced in a liquid crystal panel is discharged into the gate high voltage generator 33, the reset unit 36 controls the shutdown controller 35 to output the shutdown signal and the LCD device is powered off. Subsequently, the reset unit 36 outputs a power-on signal to the P-IC 31 and the LCD device is powered back on. As a result, the reset unit 36 resets the LCD device through the P-IC 31 by sequentially powering off and powering on the LCD device.

Figure 5:
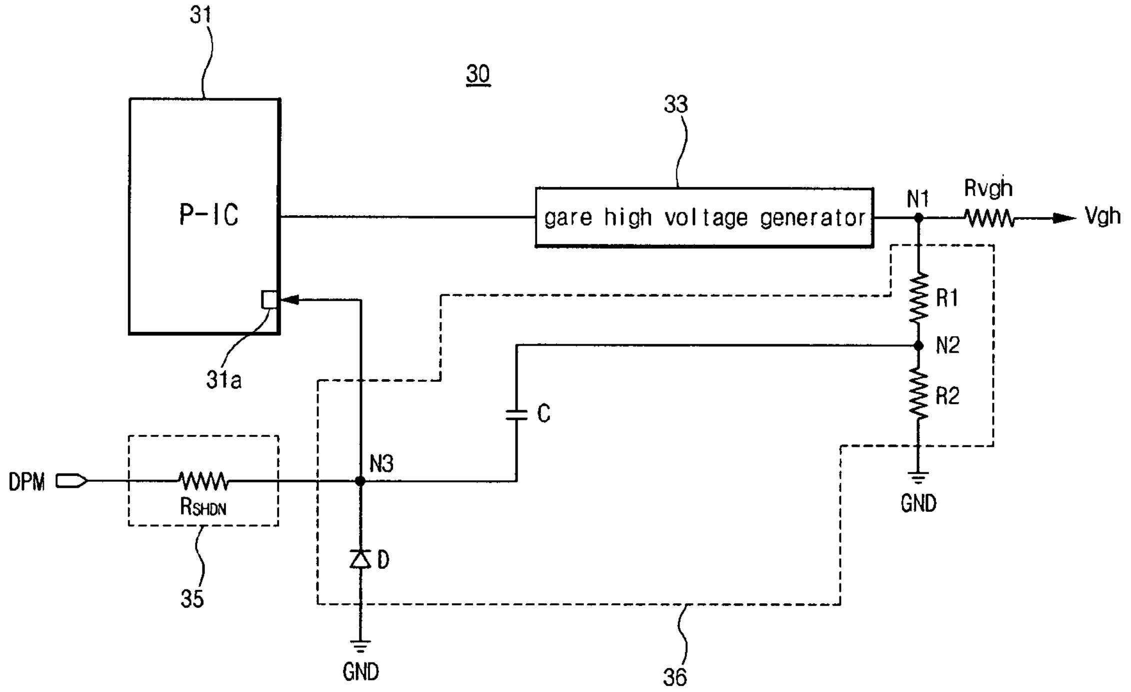
FIG. 5 is a schematic block diagram showing a reset unit of a source voltage generator of a liquid crystal display device according to one embodiment.

FIG. 5 is a schematic block diagram showing a reset unit of a source voltage generator of a liquid crystal display device according to one embodiment. FIG. 5 illustrates a power control integrated circuit (P-IC) 31, a gate high voltage generator 33, a shutdown controller 35 and a reset unit 36. The reset unit 36 includes a first resistor R1, a second resistor R2, a capacitor C and a diode D. The first and second resistors R1 and R2 are connected in series between a gate high voltage output terminal N1 of the gate high voltage generator 33 and a ground terminal GND. Accordingly, the first and second resistors R1 and R2 constitute a node N2 between the gate high voltage output terminal N1 and the ground terminal GND. The capacitor C is connected between the shutdown signal output terminal N3 of the shutdown controller 35 and the node N2. The diode D is connected between shutdown signal output terminal N3 and the ground terminal GND. The shutdown signal output terminal N3 is connected to a shutdown signal input terminal 31*a* of the P-IC 31.

In one embodiment, a resistance ratio of the first and second resistors R1 and R2 may be about 3:1. For example, the first and second resistors R1 and R2 may have resistances of about 33 kΩ and about 1 kΩ, respectively. In addition, the capacitor may have a capacitance over about 4.7 μF and a cathode of the diode D may be connected to the shutdown signal output terminal N3. Even though the reset unit 36 of FIG. 5 includes the diode D, the diode may be omitted in alternative embodiments.

In FIG. 5, the reset unit 36 may be formed as an individual circuit from the other circuits such as the P-IC 31, the driving voltage generator 32 (of FIG. 4), the gate high voltage generator 33, the gate low voltage generator 34 (of FIG. 4) and the shutdown controller 35 of the source voltage generator 30. Alternatively, the reset unit 36 may be formed in the other circuits of the source voltage generator 30. For example, the first and second resistors R1 and R2 may be formed in the gate high voltage generator 33, and the diode D may be formed in the shutdown controller 35. In addition, the capacitor C may be formed in one of the gate high voltage generator 33 or the shutdown controller 35.

For illustration purposes, in one embodiment of operation of the reset unit 36 it is assumed that the first and second resistors R1 and R2 have resistances of about 33 kΩ and 11 kΩ, respectively, and the capacitor C has a capacitance of about 10 μF. In addition, a dynamic power modulation (DPM) signal may be assumed to have a voltage of about 3.3V. In a normal operation, the gate high voltage generator 33 outputs the gate high voltage of about 25V to about 27V. Since the resistance ratio of the first and second resistors R1 and R2 is about 3:1, voltages are dropped through the first and second resistors R1 and R2 by about 19V and 6V, respectively. As a result, a voltage at the node N2 becomes about 6V. Since the DPM signal of about 3.3V is applied to the shutdown signal output terminal N3, a voltage difference between the node N2 and the shutdown signal output terminal N3 is about 2.7V and the capacitor C is charged up by the voltage difference of about 2.7V. Since the DPM signal of about 3.3V from the off-reference voltage of about 0V to about 0.7V is applied to the shutdown signal input terminal 31*a* of the P-IC 31, the P-IC 31 is stably driven in normal operation to generate the supply voltages. In alternative embodiments, the approximate voltages discussed herein may vary. The approximate voltages are used for illustrative purposes throughout this disclosure and are merely representative of one embodiment, or one example.

When static electricity is discharged from the liquid crystal panel to the source voltage generator 30, the gate high voltage generator 33 outputs an abnormal gate high voltage of about 7V due to an electrostatic discharge (ESD). Due to the voltage distribution, the voltage of the node 2 becomes about 1.75V. Since the capacitor C is charged up by the voltage difference of about 2.7V, a voltage of the shutdown signal output terminal N3 becomes about −0.95V. Accordingly, the diode D is turned on because the shutdown signal output terminal N3 has a voltage lower than the ground terminal GND, and the DPM signal is discharged to the ground terminal GND through the diode D. As a result, the shutdown signal output terminal N3 has a low level voltage of about 0V corresponding to the ground terminal GND. Therefore, the low level voltage is applied to the shutdown signal input terminal 31 a as a shutdown signal and operation of the P-IC 31 is stopped. Since the P-IC 31 does not supply the supply voltage to the driving voltage generator 32 (of FIG. 4), the gate high voltage generator 33 or the gate low voltage generator 34 (of FIG. 4), the driving voltage Vdd (of FIG. 4), the gate high voltage Vgh and the gate low voltage Vgl (of FIG. 4) are not supplied to the liquid crystal panel. Accordingly, the LCD device is substantially powered off such that images are not displayed in the liquid crystal panel.

After the LCD device is powered off, the charge in the capacitor C is discharged and the voltage of the shutdown signal output terminal N3 increases. When the voltage of the shutdown signal output terminal N3 increases over the off-reference voltage, the diode D is turned off and the DPM signal is applied to the shutdown signal output terminal N3. As a result, the P-IC 31 starts to operate and the LCD device is powered on again.

When static electricity of the liquid crystal panel is discharged into the gate high voltage generator 33 and an abnormal gate high voltage is outputted from the gate high voltage generator 33, the source voltage generator 30 powers off the LCD device and then subsequently powers on the LCD device. Accordingly, the LCD device is automatically reset by the reset unit 36 and the display of abnormal images such as a horizontal stripe is prevented. Since the reset procedure is performed for a short period of time, such as about several milliseconds to about a hundred milliseconds, the power-on/off of the LCD device is seldom recognized by a viewer of the LCD display.

Consequently, in an LCD device of the present embodiments, when static electricity is discharged, a reset procedure that automatically powers on/off the LCD device is performed by a source voltage generator including a reset unit. Accordingly, the display of abnormal images is prevented. It will be apparent to those skilled in the art that various modifications and variations can be made in a driving circuit for a liquid crystal display device and a method of driving the same of the present disclosure without departing from the spirit or scope of the embodiments. Thus, it is intended that the present disclosure cover the modifications and variations of these embodiments provided they come within the scope of the appended claims and their equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. The above disclosed subject matter is to be considered illustrative, and not restrictive, and the appended claims are intended to cover all such modifications, enhancements, and other embodiments, which fall within the true spirit and scope of the present invention.

What is claimed is:

1. A driving circuit for a display device comprising:
- a data driver configured to provide power to data lines of a display panel of the display device;
- a gate driver configured to provide power to gate lines of a display panel of the display device; and
- a source voltage generator coupled with the gate driver, the source voltage generator comprising:
  - a power control integrated circuit configured to generate a supply voltage, the power control integrated circuit including a shutdown signal input terminal;
  - a gate high voltage generator coupled with the power control integrated circuit and is supplied with the supply voltage; and
  - a reset unit coupled with the power control integrated circuit and the gate high voltage generator and configured to initiate a shut off of an output voltage of the power control integrated circuit, wherein the reset unit includes a diode and a capacitor connected to each other through a connection node, and the connection node is connected to the shutdown signal input terminal, wherein the reset unit includes first and second resistors connected in series between a gate high voltage output terminal of the gate high voltage generator and a ground terminal, the first and second resistors defining a node therebetween, wherein the capacitor is connected between the node and the connection node, and wherein a anode of the diode is connected to the ground terminal and a cathode of the diode is connected to the shutdown signal input terminal.

2. The driving circuit of claim 1 further comprising a timing controller coupled with the data driver and the gate driver.

3. The driving circuit of claim 1 wherein the shut off of the output voltage of the power control integrated circuit is in response to static electricity.

4. The driving circuit of claim 3 wherein when the static electricity induced in the display panel is discharged into the gate high voltage generator, the reset unit signals the shutdown controller to output the shutdown signal and the display device is powered off.

5. The driving circuit of claim 1 wherein the source voltage generator further comprises:
- a shutdown controller coupled with the power control integrated circuit and the reset unit, the shutdown controller configured to shut off the output voltage of the power control integrated circuit.

6. The driving circuit of claim 5 wherein the shutdown controller receives a dynamic power management signal from the timing controller and is configured to control the power control integrated circuit to be turned on or off.

7. The driving circuit of claim 1 wherein a gate high voltage is supplied to the gate driver from the gate high voltage generator and is used to generate a gate signal that is applied to gate lines of the display panel.

8. The driving circuit of claim 1 wherein the source voltage generator further comprises:
- a driving voltage generator coupled with the power control integrated circuit and configured to provide a voltage to the data driver; and
- a gate low voltage generator coupled with the power control integrated circuit and configured to provide a voltage to the gate driver.

9. A source voltage generator for powering a display comprising:
- a power control integrated circuit configured to receive an external voltage and output a source voltage, the power control integrated circuit including a shutdown signal input terminal;
- a gate high voltage generator coupled with the power control integrated circuit and is supplied with the source voltage;

a shutdown controller coupled with the power control integrated circuit and configured to provide a shutdown signal to the power control integrated circuit; and a reset unit coupled with the shutdown controller and coupled with the gate high voltage generator, the reset unit configured to initiate the transmission of the shutdown signal to the power control integrated circuit from the shutdown controller upon detection of an overvoltage condition, wherein the reset unit includes a diode and a capacitor connected to each other through a connection node and the connection node is connected to the shutdown signal input terminal, wherein the reset unit includes first and second resistors connected in series between a gate high voltage output terminal of the gate high voltage generator and a ground terminal, the first and second resistors defining a node therebetween, wherein the capacitor is connected between the node and the connection node, and wherein a anode of the diode is connected to the ground terminal and a cathode of the diode is connected to the shutdown signal input terminal.

10. The source voltage generator of claim 9 wherein the overvoltage condition comprises a buildup of static electricity.

11. The source voltage generator of claim 9 further comprising:

a driving voltage generator coupled with the power control integrated circuit and configured to provide a voltage to a data driver for the display; and a gate low voltage generator coupled with the power control integrated circuit and configured to provide a voltage to a gate driver for the display.

12. The device according to claim 11, wherein the gate high voltage is within a range of about 25V to about 27V, and the gate low voltage is within a range of about −7V to about −5V.

13. The source voltage generator of claim 11 wherein the overvoltage condition is detected at the gate high voltage generator.

14. The source voltage generator of claim 13 wherein when static electricity induced in the display panel is discharged into the gate high voltage generator, the reset unit signals the shutdown controller to output the shutdown signal and the display device is powered off.

15. The source voltage generator of claim 9, wherein the first and second resistors have a resistance ratio of about 3:1.

16. The source voltage generator of claim 15, wherein the first and second resistors have resistances of about 33kΩ and about 11kΩ, respectively.

17. The source voltage generator of claim 9 wherein the shutdown signal to the power control integrated circuit from the shutdown controller is configured to shut off the source voltage of the power control integrated circuit.

18. The source voltage generator of claim 9 wherein the shutdown controller receives a dynamic power management signal from a timing controller and is configured to turn on the power control integrated circuit and turn off the power control integrated circuit.

19. A method for resetting a display device comprising:

providing a power control integrated circuit, a reset unit and a gate high voltage generator coupled with the power control integrated circuit and coupled with the reset unit in a source voltage generator, the power control integrated circuit including a shutdown signal input terminal and supplying a source voltage to the gate high voltage generator, wherein the reset unit includes a diode and a capacitor connected to each other through a connection node, and the connection node is connected to the shutdown signal input terminal, wherein the reset unit includes first and second resistors connected in series between a gate high voltage output terminal of the gate high voltage generator and a ground terminal, the first and second resistors defining a node therebetween, wherein the capacitor is connected between the node and the connection node, and wherein a anode of the diode is connected to the ground terminal and a cathode of the diode is connected to the shutdown signal input terminal;

detecting a buildup of static electricity at the source voltage generator;

generating a shutdown signal in the reset unit in response to the detection of the buildup of static electricity at the source voltage generator;

shutting off a source voltage output from the source voltage generator in response to the shutdown signal; and powering on the source voltage output following the shutting off of the source voltage output. voltage output following the shutting off of the source voltage output.

* * * * *